United States Patent
Ramakrishnan et al.

(10) Patent No.: US 8,243,899 B2
(45) Date of Patent: Aug. 14, 2012

(54) METHOD AND APPARATUS FOR A PROCESSING OF CALLS IN A TELECOMMUNICATIONS SYSTEM

(75) Inventors: Ramki Ramakrishnan, Bangalore (IN); Ananth Seetharam, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 810 days.

(21) Appl. No.: 12/376,008

(22) PCT Filed: Aug. 3, 2007

(86) PCT No.: PCT/US2007/075140
§ 371 (c)(1),
(2), (4) Date: Feb. 2, 2009

(87) PCT Pub. No.: WO2008/024608
PCT Pub. Date: Feb. 28, 2008

(65) Prior Publication Data
US 2009/0310769 A1    Dec. 17, 2009

(30) Foreign Application Priority Data
Aug. 23, 2006  (IN) .......... 1320/MUM/2006

(51) Int. Cl.
*H04M 3/42* (2006.01)
*H04W 4/00* (2009.01)
(52) U.S. Cl. ............ 379/201.02; 379/201.05; 455/432.3
(58) Field of Classification Search ............ 379/201.02, 379/88.16, 211.02, 201.01, 201.05; 455/414.2, 455/432.3
See application file for complete search history.

(56) References Cited

U.S. PATENT DOCUMENTS

| | | | |
|---|---|---|---|
| 6,430,289 B1 | 8/2002 | Liffick | |
| 7,324,638 B2 * | 1/2008 | Mullis et al. | 379/211.02 |
| 2004/0174976 A1 | 9/2004 | Elliott | |
| 2005/0041793 A1 | 2/2005 | Fulton et al. | |
| 2005/0074113 A1 | 4/2005 | Mathew et al. | |
| 2005/0118996 A1 | 6/2005 | Lee et al. | |
| 2005/0143138 A1 | 6/2005 | Lee et al. | 379/88.16 |
| 2007/0081640 A1 * | 4/2007 | Jachner | 379/88.16 |
| 2011/0111740 A1 * | 5/2011 | Graefen | 455/414.2 |

OTHER PUBLICATIONS

BuzMe Answer—Broadband Internet Call Waiting and Voicemail, http://www.buzme.com/buzme/service/answer.asp, Jan. 23, 2009, pp. 1-6.
iobi—Verizon, https://www22.verizon.com/iobi/, Jan. 29, 2009, p. 1.

* cited by examiner

*Primary Examiner* — Thjuan K Addy
(74) *Attorney, Agent, or Firm* — Steven May

(57) ABSTRACT

A method and apparatus for a processing of a call in a telecommunication system is provided. Multiple personalization policies are specified by a callee (106) for a processing of calls. Each personalization policy is based on one or more conditions. Each condition of the multiple personalization policies is evaluated (202). A set of actions then is selected based on the evaluation of the conditions, wherein each action in the set of actions corresponds to a personalization policy. A subset of the set of actions then may be presented (204) to the callee as a set of options, wherein each option corresponds to an action in the subset of the set of actions and wherein an order of the options presented may be based on an algorithms. Thereafter, an option is selected (206) from a set of options, and the call is processed based on the selected option.

14 Claims, 4 Drawing Sheets

```
{
PP1: When in the office, forward the call to my cell phone
PP2: When in a meeting, forward calls to my voice mail
PP3: When John calls, respond with text "You don't have to call me I'll call you"
PP4: When Plumber calls, forward the calls to Jane
PP5: When in home, forward calls to my home phone
}
Else
{
PP6: Respond with text, " I am busy, call later"
}
Default Action : Forward calls to my home phone
```

302

```
Forward to voice mail
Forward call to cell phone
Respond with text "You don't have to call me, I'll call you"
Forward the call to Jane
```

METHOD AND APPARATUS FOR A PROCESSING OF CALLS IN A TELECOMMUNICATIONS SYSTEM

FIELD OF INVENTION

The invention generally relates to a telecommunications system. More specifically, the invention relates to a method and apparatus for a processing of calls in the telecommunications system.

BACKGROUND OF THE INVENTION

In a telecommunications system, a call is initiated by a caller for a callee. The call is routed through a call server. Applications running on, or in association with, the call server may then generate a mode for routing the call based on contextual information corresponding to the callee, such as, but not limited to, a time-of-the-day, a presence of the callee, an availability of the callee, and a location of the callee. The call server may then utilize the call routing mode generated by the applications to route the call.

The contextual information corresponding to the callee is stored in one or more contextual servers. However, if the contextual information is not correct, is not available, or cannot be obtained correctly, then the applications may generate a wrong mode for routing the call to the callee.

Furthermore, call routing based on contextual information suffers from the drawback that in conventional applications, a fixed set of options for routing the call is presented on an end-device used by a callee. Thereafter, the call is routed by the call server based on an option selected by the callee from the set of options. The set of options presented on an end-device is same for each user using the application. Moreover, the order of the options is also the same for each user using the application.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 3 is a block diagram showing an exemplary plurality of Personalization Policies (PP) specified by a callee and an exemplary action subset in accordance with an embodiment of the invention.

Figure 1:
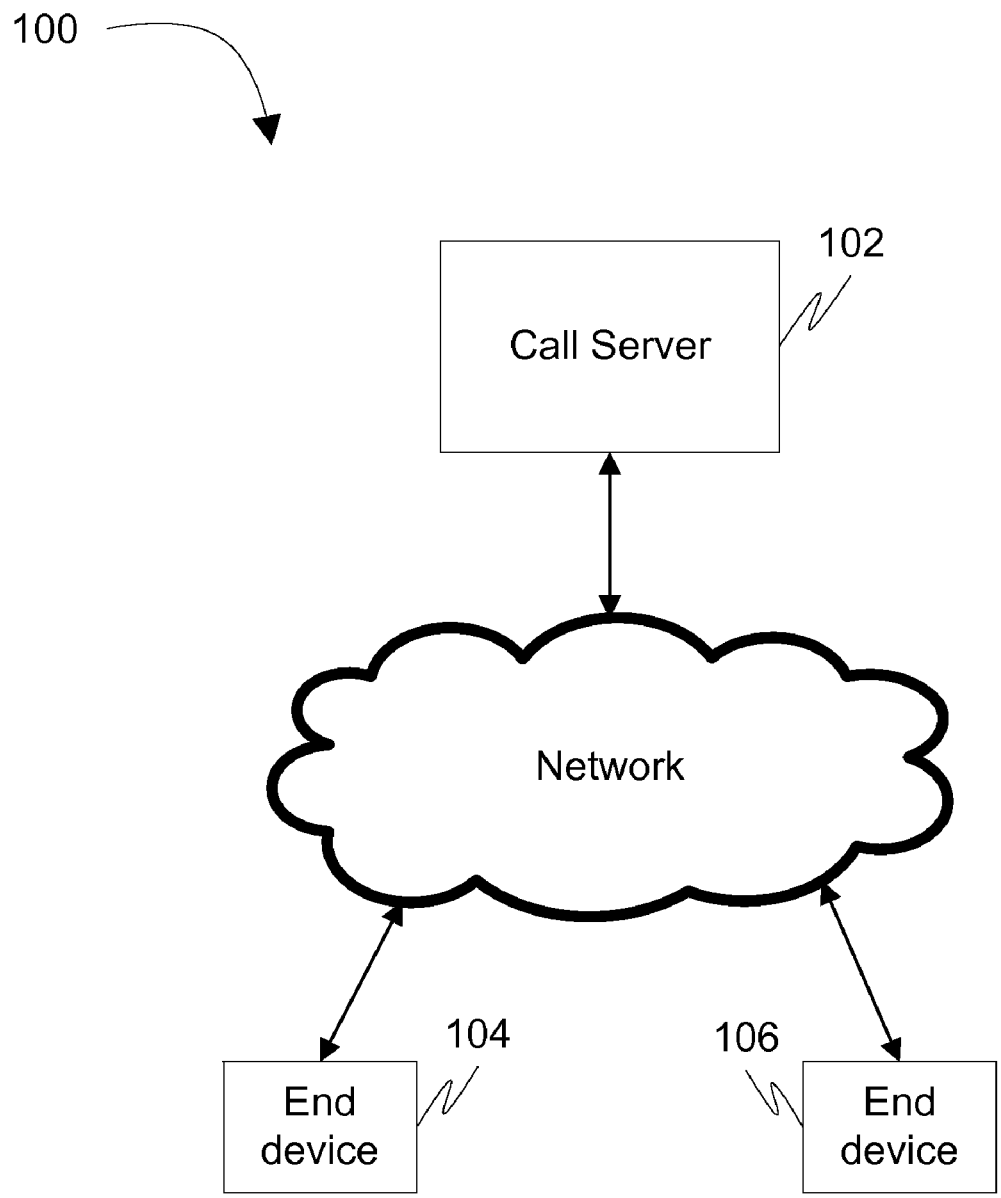
FIG. 1 is a block diagram showing an exemplary environment in which various embodiments of the invention can function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to processing a plurality of calls in a telecommunication system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and apparatus for processing a plurality of calls in a telecommunications system. A plurality of personalization policies are specified by a callee for processing the plurality of calls. Each personalization policy is based on one or more conditions. Each condition of the plurality of personalization policies is evaluated. A set of actions then is selected based on the evaluation of the conditions, wherein each action in the set of actions corresponds to a personalization policy. A subset of the set of actions then may be presented to the callee as a set of options, wherein each option corresponds to an action in the subset of the set of actions. The set of options and an order of the options presented may be based on one or more algorithms. Thereafter, an option is selected from a set of options, and the call is processed based on the selected option.

FIG. 1 is a block diagram showing an exemplary telecommunication system 100 in which various embodiments of the invention can function. The telecommunications system 100 includes a call server 102 that is in communication with each end-device of a plurality of end-devices 104, 106 (two shown) via an intervening telecommunications network. Examples of the end-devices may include but are not limited to a cell phone, a Personal Digital Assistant (PDA), a landline phone. For the purpose of illustrating the principles of the present invention, it is assumed that the end-device 104 is used by a caller and the end-device 106 is used by a callee. The caller initiates a call for the callee using the end-device 104. The call is routed by the call server 102 to the end-device 106.

Figure 2:
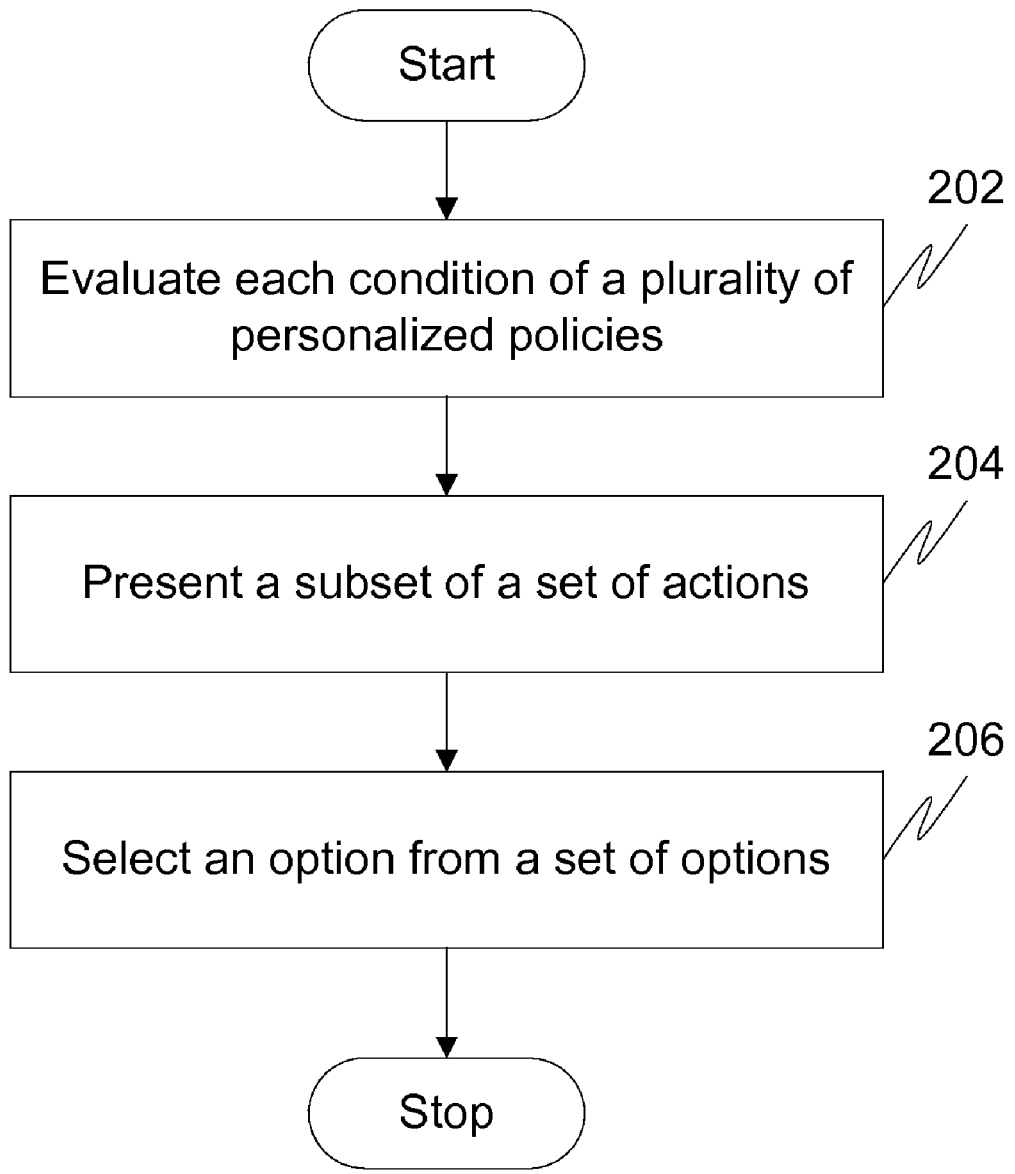
FIG. 2 is a flowchart of a method of processing a plurality of calls in a telecommunications system in accordance with an embodiment of the invention.

FIG. 2 is a flowchart of a method of processing a plurality of calls in a telecommunications system in accordance with an embodiment of the invention. In the telecommunications system, a call is initiated by a caller for a callee. In response to the call initiated by the caller, at step 202, each condition of one or more conditions associated with a plurality of personalization policies is evaluated, preferably based on predefined criteria. That is, a plurality of personalization policies associated with the callee are specified by the callee for processing the plurality of calls. Each personalization policy is based on a condition and comprises a corresponding action. In turn, the conditions are evaluated based on contextual information, such as but not limited to, a time-of-the-day, a presence of the callee, an availability of the callee, and a location of the callee. For example, a personalization policy may comprise a policy such as "if I am in a meeting, forward calls to my voice mail." The personalization policy is based on a condition, "if I am in a meeting," which is associated with the callee, and includes a corresponding action, "forward calls to my voice mail." By way of another example, a personalization policy may comprise a policy such as "if I am in the office, forward calls to my cell phone." The personalization policy is based on a condition, "if I am in the office," which is associated with the callee, and includes a corresponding action, "forward calls to my cell phone."

After evaluating each condition of the one or more conditions associated with a plurality of personalization policies at step 202, a subset of a set of actions is presented to a user of an end-device based on one or more predefined criteria. The predefined criteria are used to select the set of actions. For example, a predefined criterion may comprise a requirement that a condition is true. As a result, all conditions of the plurality of personalization policies that evaluate to being true meet the predefined criteria, and the actions of the plurality of personalization policies whose corresponding conditions are true are then selected for the set of actions. This is explained further in conjunction with FIG. 3. The subset of the set of actions is then selected based on an execution of a first algorithm. In an embodiment of the invention, the first algorithm may select a subset of the set of actions such that the subset includes actions that are most frequently used by the callee. The actions in the subset of the set of actions may be ordered based on an execution of a second algorithm. In an embodiment of the invention, the second algorithm may order the actions in the subset such that the actions are in a descending order of frequency of use. For example, the action that is used most frequently in the subset of the set of actions is placed at a first position in the subset. This also is further explained in conjunction with FIG. 3.

The conditions associated with the plurality of personalization policies are evaluated based on contextual information associated with the callee. That is, a condition associated with each personalization policy may specify one or more elements of corresponding contextual information and, in turn, a contextual information element, such as a location of a callee, may correspond to a condition of each of multiple personalization policies of the plurality of personalization policies. Again, examples of the contextual information associated with the callee may include, but are not limited to, a location, a presence, and an availability of the callee. As a result, a condition associated with a personalization policy, such as "if I am in a meeting" or "if I am in the office," may be evaluated based on contextual information such as a location, a presence, and/or an availability of the callee.

For example, suppose the one or more predefined criteria comprise a requirement that a condition associated with the plurality of personalization policies evaluate to true. Further, suppose the plurality of personalization policies specified by the callee includes "if I am in the office, forward calls to my cell phone" and "if I am in a meeting, forward calls to my voice mail." The two conditions associated with the personalization policies are "if I am in the office" and "if I am in a meeting." Further, suppose the contextual information indicates that the callee is in a meeting in the office. As this contextual information affirms each of the conditions "if I am in the office" and "if I am in a meeting," each of these conditions will evaluate to true and the corresponding actions, "forward calls to my cell phone" and "forward calls to my voice mail," will both be indicated by the predefined criterion. That is, when a plurality of conditions associated with the plurality of personalization policies evaluate to true, then the set of actions includes an action corresponding to each such true condition. For example, if the callee is in a meeting in the office, then the set of actions includes the action "forward calls to my cell phone" (corresponding to the condition "if I am in the office") and the action "forward calls to my voice mail" (corresponding to the condition "if I am in the meeting"). Thereafter, the subset of the set of actions may be selected based on the first algorithm and the actions in the subset may be ordered based on the second algorithm.

The information required to evaluate a condition may be inaccurate due to an unavailability of contextual information associated with the callee. For example, a server that stores the location information for the callee may not be working. As a result, a personalization policy that includes a condition "if I am in the office," which corresponds to the location of the callee, may not be evaluated accurately.

Additionally, the information required to evaluate a condition may be inaccurate due to a partial determination of the contextual information associated with the callee or an inability to determine the contextual information associated with the callee. For example, a personalization policy may include a condition "if I am in a meeting," which condition corresponds to an availability of the callee. The personalization policy may be evaluated based on a calendar application of an end-device used by the callee to maintain his or her schedule and further based on a presence of one or more users in geographical proximity to the callee. An availability server stores the availability information of the callee by extracting the schedule maintained by the callee in the calendar application of the end-device used by the callee. When a call is received for the callee, the schedule of the callee may be available from the availability server but one or more users in geographical proximity with the callee may not be determined. As a result, the contextual information of the callee is only partially determined.

If the contextual information required to evaluate a condition associated with the callee is inaccurate, then the set of actions corresponding to the plurality of personalization policies may include an action corresponding to a condition that may be evaluated based on inaccurate or missing information. For example, suppose a location server is down and an availability server has partial information corresponding to availability of the callee. In such an instance, if the predefined criterion comprises a requirement that none of the conditions be false, or comprises a criterion that conditions evaluated based on missing or partially determined contextual information pass the criterion, then the actions corresponding to the conditions that cannot be determined to be false may be included in the set of actions. That is, the set of actions will include each action corresponding to each such non-false condition.

The subset of the set of actions is then presented as a set of options on one or more end-devices used by the callee. The set of options may be displayed the on one or more end-devices used by the callee based on a third algorithm. For example, the callee may specify that the set of options should be displayed on cell phone and a PDA device used by the callee. Each option corresponds to an action in the subset of the set of actions. At step 206, an option from the set of options is selected by the callee, and the call is processed based on the option selected by the callee. However, if the callee discards the set of options presented on the one or more end-devices used by the callee, then the call may be processed based on a default action. For example, a default action may comprise "forward the call to my home phone." Therefore, if the callee discards the set of options then the call will be routed to home phone of the callee. The default action may be specified by the callee in the plurality of personalization policies.

Referring back to the step 204, if no condition meets the predefined criterion, for example, if all of the conditions are false when the predefined criterion requires that a condition be true, then the call is processed without presenting a subset of the set of actions.

FIG. 3 is a block diagram showing an exemplary plurality of Personalization Policies (PP) 302 specified by a callee and an exemplary action subset 304 in accordance with an embodiment of the invention. The plurality of PP 302 includes PP1, PP2, PP3, PP4, PP5, and PP6. PP1 corresponds to "when in the office, forward call to my cell phone," PP2 corresponds to "when in a meeting, forward calls to my voice mail," PP3 corresponds to "when John calls, respond with text 'you do not have to call me. I'll call you,'" PP4 corresponds to "when plumber calls, forward call to Jane," PP5 corresponds to "when in home, forward calls to my home phone," and PP6 corresponds to "respond with text, I am busy call later." Further, the callee can also specify a default action that can be processed if the callee discards the set of options presented on one or more end-devices used by the callee. The default action can be for example, "Forward calls to my home phone," as illustrated in FIG. 3.

For example, suppose John, who is a plumber, initiates a call for the callee when the callee is in a meeting in the office. Further, suppose the contextual-information server that stores location information is not working and the predefined criterion is that a condition not be false. Therefore, the set of actions that are selected based on an evaluation of conditions of the plurality of personalization policies includes "forward the call to voice mail," as the corresponding condition is evaluated based on an availability of the callee, who is not available as the callee is in a meeting. The set of actions further includes the action "forward the call to my cell phone," as the callee is in the office. The set of actions further includes "respond with text 'you don't have to call me, I'll call you,'" as the caller is John. Further, the set of actions includes "forward the call to Jane," as the caller is a plumber. Finally, the set of actions includes "forward calls to my home phone," as the corresponding condition is evaluated based on a location of the caller, that is, John, which is unknown.

The action subset 304 is a subset of the set of actions generated in response to the call initiated by John. The action subset 304 is selected based on a first algorithm. For example, the first algorithm may select actions that are most frequently used by the callee. The callee uses the action "forward calls to my home phone" least frequently. Therefore, the action subset 304 includes the actions "forward the call to voice mail," "forward the call to cell phone," "respond with text, 'you don't have to call me, I'll call you,'" and "forward the call to Jane," but does not include the action "forward calls to my home phone." The actions in the action subset 304 then are ordered based on a second algorithm. For example, the second algorithm may order the actions based on a frequency of use. As a result, the most frequently used action by the callee, for example, "forward the call to voice mail," is placed first in the action subset 304 and other actions are placed in descending order of frequency of use. The action subset 304 then is presented as a set of options on one or more end-device used by the callee. Thereafter, the call is routed based on an option selected by the callee. However, if the callee discards the set of options, then the call may be routed based on the default action specified by the callee, that is, "forward calls to my home phone."

Figure 4:
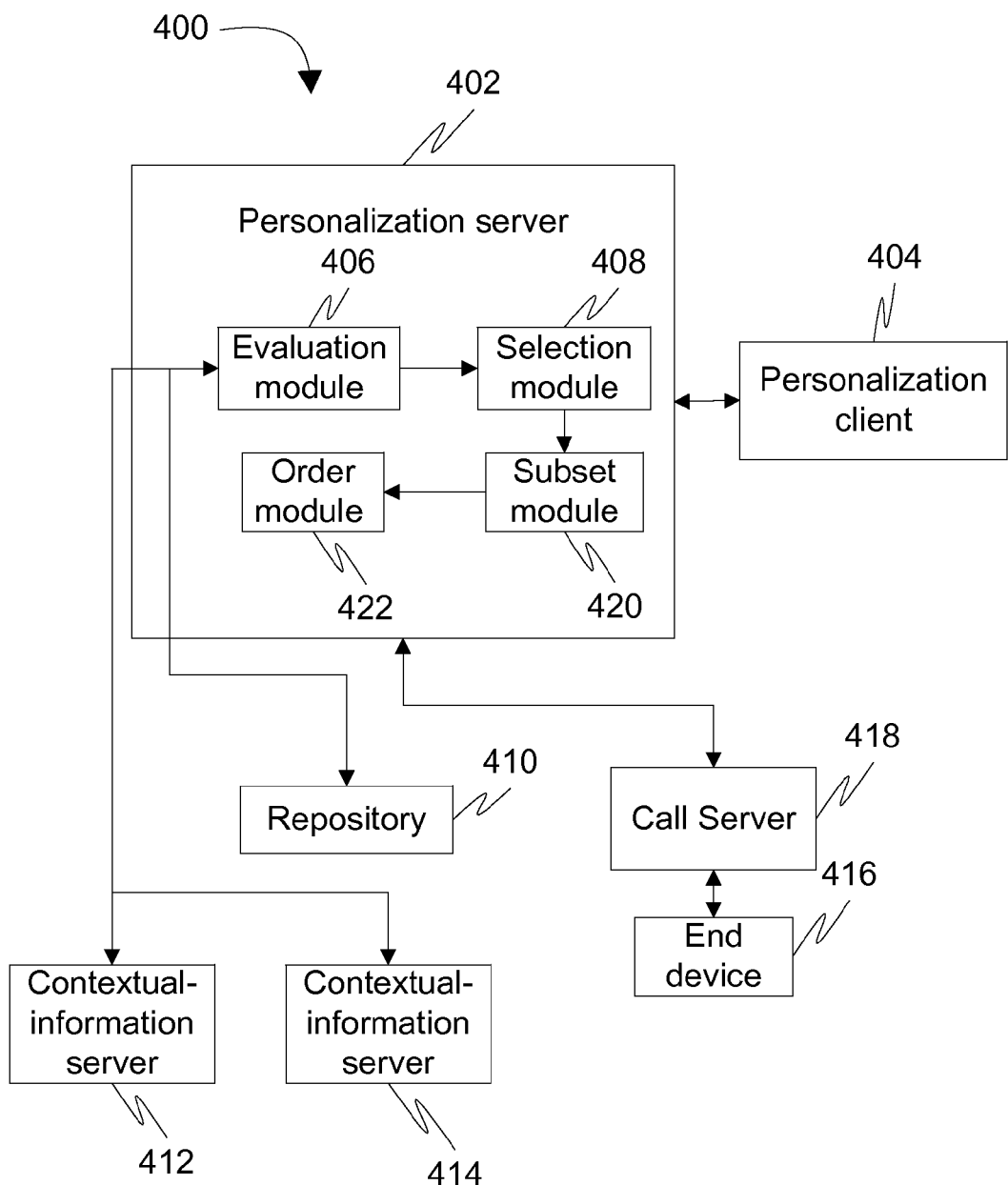
FIG. 4 is block diagram showing an apparatus for processing a plurality of calls in a telecommunications system in accordance with an embodiment of the invention.

FIG. 4 is a block diagram showing an apparatus 400 for processing a plurality of calls in a telecommunications system in accordance with an embodiment of the invention. The apparatus 400 includes a personalization server 402 and a personalization client 404. In one embodiment of the invention, the personalization client 404 may be installed on one or more end-devices used by the callee. In another embodiment of the invention, each of the personalization server 402 and the personalization client 404 may be installed on one or more end-devices used by the callee.

The personalization server 402 includes an evaluation module 406, a selection module 408, a subset module 420, and an order module 422. The evaluation module 406 evaluates each condition of a plurality of personalization policies associated with a callee based on contextual information associated with the callee. The plurality of personalization policies are specified by the callee for processing the plurality of calls and each personalization policy of the plurality of personalization policies is based on one or more conditions. The apparatus 400 further includes a repository 410 that stores the plurality of personalization policies. One or more contextual-information servers 412, 414 (two shown) store the contextual information associated with the callee. For example, the contextual-information server 412 may store information corresponding to a location of the callee and the contextual-information server 414 may store information corresponding to an availability of the callee.

A caller initiates a call for the callee, for example, from an end-device 416. In response to the call initiated by the caller, the evaluation module 406 communicates with the one or more contextual-information servers 412, 414 to determine the contextual information of the callee. Thereafter, the evaluation module 406 communicates with the repository 410 to evaluate each condition of the plurality of personalization policies. Each condition is evaluated based on the contextual information of the callee determined by reference to the one or more contextual-information servers 412, 414. This has been explained in conjunction with FIG. 2. Thereafter, a call server 418 of apparatus 400 communicates with the personalization server 402 to process the call.

Based on the evaluation of each condition of the plurality of personalization policies, the selection module 408 of the personalization server 402 selects a set of actions based on one or more predefined criteria, for example, when one or more conditions are true. Each action in the set of actions corresponds to a personalization policy of the plurality of personalization policies associated with the callee. This has been explained in conjunction with FIG. 2.

Thereafter, the subset module 420 in the personalization server 402 selects a subset of the set of actions for presentation to the callee. The subset is selected based on a first algorithm. This has been explained in conjunction with FIG. 2. The order module 422 in the personalization server 402 then determines the order of actions based on a second algorithm. This also has been explained in conjunction with FIG. 2.

The personalization client 404 communicates with the personalization server 402 to determine the subset of the set of actions to be presented to the callee. The subset of the set of actions may then be presented on one or more end-devices used by the callee based on a third algorithm. This has been explained in conjunction with FIG. 2. The subset of the set of actions is then presented as a set of options. The callee may then select an option from the presented set of options. Thereafter, the personalization client 404 communicates the selected option to the personalization server 402. The personalization server 402 in turn communicates with the call server 418 to process the call based on the option selected.

Various embodiments of the invention provide methods and systems for processing a call by presenting a set of options to a callee on one or more end-devices used by the callee. The set of options correspond to personalization policies specified by the callee.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of processing a call in a telecommunications system, the method comprising:
    evaluating each condition of a plurality of personalization policies associated with a callee, wherein each personalization policy is based on one or more conditions and the plurality of personalization policies are specified by the callee for processing a plurality of calls;
    determining a subset of a set of actions based on at least one predefined criterion, wherein the set of actions is selected based on the evaluation of each condition of the plurality of personalization policies and each action in the set of actions corresponds to a personalization policy;
    presenting a set of options to the callee, wherein each option in the set of options corresponds to an action in the subset of the set of actions;
    receiving a selection of an option from the callee; and
    processing the call based on the selected option.

2. The method of claim 1, wherein each condition of the plurality of personalization policies is evaluated in response to the call initiated by a caller for the callee.

3. The method of claim 1, wherein the call is processed without presenting the subset of the set of options when the at least one predefined criterion is not met.

4. The method of claim 1, wherein the at least one predefined criterion comprises one or more of an inaccuracy of information required to evaluate a condition associated with the callee and a requirement that a condition of the plurality of personalization policies evaluate to true.

5. The method of claim 1, wherein the set of actions comprises one or more of an action corresponding to each condition having inaccurate information required for evaluation and an action corresponding to each condition evaluating to true.

6. The method of claim 1, further comprising, when no selection of an option is received, processing the call based on a default action, wherein the default action is specified by the callee in the plurality of personalization policies.

7. An apparatus for a processing of calls in a telecommunications system, the apparatus comprising:
    a personalization server, wherein the personalization server comprises:
        an evaluation module, wherein the evaluation module evaluates each condition of a plurality of personalization policies associated with a callee, wherein each personalization policy is based on one or more conditions and the plurality of personalization policies are specified by the callee for processing the plurality of calls; and
        a selection module, wherein the selection module selects a set of actions based on at least one predefined criterion, wherein the set of actions is selected based on the evaluation of each condition of the plurality of personalization policies, and wherein each action in the set of actions corresponds to a personalization policy; and
    wherein the personalization server evaluates each condition of the plurality of personalization policies in response to a call initiated by a caller for the callee and generates a subset of the set of actions for enabling the callee to select an option from a set of options corresponding to the subset of the set of actions to process the call.

8. The apparatus of claim 7, further comprising a personalization client that presents a subset of a set of actions to the callee, wherein the subset of the set of actions is presented as a set of options to the callee.

9. The apparatus of claim 8, wherein one or more of the personalization server and the personalization client are installed on at least one end-device used by the callee.

10. The apparatus of claim 7, wherein the personalization server further comprises:
    a subset module, wherein the subset module selects the subset of the set of actions based on a first algorithm; and
    an order module, wherein the order module determines an order of actions in the subset of the set of actions based on a second algorithm.

11. The apparatus of claim 7, further comprising at least one contextual-information server that stores information used to evaluate the conditions of the plurality of personalization policies.

12. The method of claim 1, further comprising determining an order of options in the set of options corresponding to an action in the subset of the set of actions.

13. The method of claim 12, further comprising determining an order of options in the set of options based on the frequency of use of the corresponding actions in the subset of set of actions by the callee.

14. The method of claim 1, wherein presenting a set of options to the callee comprises selecting an end device of the callee.

* * * * *